No. 640,699. Patented Jan. 2, 1900.
W. P. QUENTELL.
TYPE BAR.
(Application filed Apr. 20, 1899.)

(No Model.)

WITNESSES:
William Miller
Chas. E. Roeusgen

INVENTOR
William P. Quentell
BY
Hauff + Hauff
ATTORNEYS

UNITED STATES PATENT OFFICE.

WILLIAM P. QUENTELL, OF HARRISBURG, PENNSYLVANIA, ASSIGNOR TO THE KEYSTONE TYPEWRITER COMPANY, OF NEW YORK, N. Y.

TYPE-BAR.

SPECIFICATION forming part of Letters Patent No. 640,699, dated January 2, 1900.

Application filed April 20, 1899. Serial No. 713,773. (No model.)

*To all whom it may concern:*

Be it known that I, WILLIAM P. QUENTELL, a citizen of the United States, residing at Harrisburg, in the county of Dauphin and State of Pennsylvania, have invented new and useful Improvements in Type-Bars, of which the following is a specification.

By means of this invention a type-head can be mounted on a type-bar of a type-writing machine so as to be readily rotatable and to be at all times in position for accurate or clean printing, while at the same time the bars and heads are readily interchangeable and wear or looseness can be taken up.

The invention is set forth in the following specification and claims and illustrated in the annexed drawings, in which—

Figure 1:
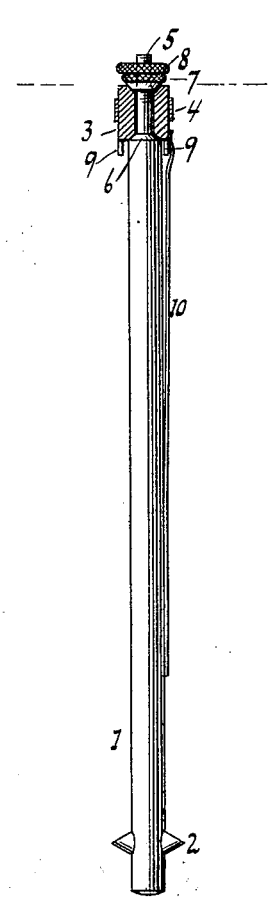
Figure 2:
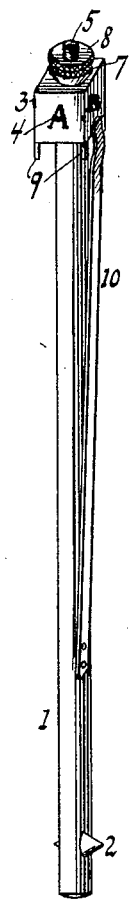
Figure 3:

Figure 1 is a longitudinal elevation of the bar with the head in section. Fig. 2 is a perspective view of the bar and head. Fig. 3 is a sectional plan view of Fig. 1.

The type-bar 1 is adapted to swing about any suitable fulcrum or pivot—say, for example, at the point 2—so that the type-head 3 on the bar will give a stroke or print. The head 3 has two or more faces, with characters or type 4, and the head is rotatable on the bar, so that different faces or type can be set to print. The bar is shown with a diminished or stem portion 5, and the part 6 between the stem 5 and body part 1 is shaped as a center or cone. The stem 5 is threaded for the reception of a nut 7, also shaped as a cone or center. A jam or lock nut 8 may also be applied.

The type-head 3 is rotatively mounted on the bar between the centers or conical bearings 6 and 7. This head 3 has a hub or center portion for the passage of stem 5 and also has center or cone-shaped recesses made to seat or fit the bearing 6 and nut 7. By means of this centering the head is made easily rotatable, and the adjustable bearing 7, which serves for mounting the head on the bar, can be set to take up wear and to prevent looseness of the head on the bar. Of course at either one or both bearings 6 and 7 there might be ball-races for antifriction-balls; but such modifications are obvious and such balls have not been found necessary. The conical or center bearings are also of advantage, as they allow the bars and heads to be made readily interchangeable, which would not be the case if a tubular hub of the head had to fit a cylindrical shaft.

The head could be rotated or set by hand or automatically, and one or more lugs 9 can be applied for facilitating or securing rotation of the head. A spring 10 can be applied to prevent accidental rotation of the head.

What I claim as new, and desire to secure by Letters Patent, is—

1. A type-bar having a type-head and centers or cone-bearings for the head substantially as described.

2. A type-bar having a conical or center bearing 6 and a conical or center shaped nut, and a type-head rotatively mounted on the bar between the bearing and nut and having center or cone-shaped recesses fitted to the bearing and nut substantially as described.

In testimony whereof I have hereunto set my hand in the presence of two subscribing witnesses.

WILLIAM P. QUENTELL.

Witnesses:
GEO. S. ANDERSON,
B. F. NEWMAN.